United States Patent
Sei

(10) Patent No.: US 10,205,845 B2
(45) Date of Patent: Feb. 12, 2019

(54) IMAGE READING USING A DUPLEX SCANNING FUNCTION

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Masaaki Sei, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 113 days.

(21) Appl. No.: 14/948,583

(22) Filed: Nov. 23, 2015

(65) Prior Publication Data

US 2017/0149996 A1    May 25, 2017

(51) Int. Cl.
*H04N 1/203* (2006.01)
*H04N 1/32* (2006.01)
*H04N 1/00* (2006.01)
*H04N 1/04* (2006.01)

(52) U.S. Cl.
CPC ......... *H04N 1/2032* (2013.01); *H04N 1/0057* (2013.01); *H04N 1/0096* (2013.01); *H04N 1/0464* (2013.01); *H04N 1/3248* (2013.01); *H04N 1/3263* (2013.01); *H04N 1/32651* (2013.01)

(58) Field of Classification Search
CPC .. H04N 1/3263; H04N 1/2032; H04N 1/3248; H04N 1/32651; G03G 15/70
See application file for complete search history.

(56) References Cited

U.S. PATENT DOCUMENTS

| 7,715,779 | B2 | 5/2010 | Kondo et al. | |
|---|---|---|---|---|
| 2006/0012837 | A1* | 1/2006 | Ishikawa | H04N 1/0057 358/474 |
| 2006/0044620 | A1* | 3/2006 | Namikawa | H04N 1/00795 358/296 |
| 2007/0127087 | A1* | 6/2007 | Nabemoto | H04N 1/00358 358/468 |
| 2009/0027745 | A1* | 1/2009 | Kweon | H04N 1/203 358/498 |
| 2009/0168093 | A1* | 7/2009 | Kim | H04N 1/00572 358/1.15 |
| 2010/0020370 | A1* | 1/2010 | Ishikawa | H04N 1/00413 358/498 |
| 2011/0058233 | A1* | 3/2011 | Oshima | H04N 1/00572 358/498 |

(Continued)

*Primary Examiner* — Nicholas Pachol
(74) *Attorney, Agent, or Firm* — Amin, Turocy & Watson LLP

(57) ABSTRACT

An image reading apparatus comprises a first reading section; a second reading section; a conveyance section which conveys the sheet sequentially to the first reading section and the second reading section; a control section which executes a first storage operation of storing image data read by the first reading section in a storage section and a second storage operation of storing image data read by the second reading section in the storage section, determines whether the reading operations of the first reading section and the second reading section, the first and the second storage operations are ended normally and deletes, if any one of the operations is not ended normally, the image data of the sheet not scanned normally stored in the storage section.

9 Claims, 4 Drawing Sheets

(56) References Cited

U.S. PATENT DOCUMENTS

| | | | |
|---|---|---|---|
| 2012/0069393 A1* | 3/2012 | Shoji | H04N 1/00448 358/1.15 |
| 2012/0194846 A1* | 8/2012 | Adachi | H04N 1/387 358/1.14 |
| 2014/0253937 A1* | 9/2014 | Fujishita | H04N 1/00413 358/1.13 |
| 2016/0127590 A1* | 5/2016 | Hatayama | B65H 5/06 358/498 |
| 2016/0323463 A1* | 11/2016 | Ogawa | G06F 3/1207 |

* cited by examiner

IMAGE READING USING A DUPLEX SCANNING FUNCTION

FIELD

Embodiments described herein relate to an image reading apparatus having a duplex scanning function.

BACKGROUND

An image reading apparatus is known which scans the both sides of an original sheet at a time when the original sheet is conveyed so as to acquire electronic image data of the two sides of the original sheet. In a conventional image reading apparatus, there also is an apparatus in which the reading position of front surface of an original sheet is different from that of back surface of the original sheet according to convenience for design.

In the use of an image reading apparatus having two different reading positions for duplex scanning, due to the difference in the front surface reading position and the back surface reading position, the timing at which the scanning on the front surface of a sheet is ended is different from that at which the scanning on the back surface of the sheet is ended. When the image reading apparatus is used for scanning, if an error such as a paper jam occurs in a conveyance path during the conveyance process of an original sheet, then it happens that the scanning on the back surface of an original sheet is not completed even if the scanning on the front surface of the original sheet is completed.

If the error occurs, after eliminating the error, the user places the original sheet on a feed tray again to scan the original sheet again. On this occasion, if the front surface and the back surface of the original sheet are placed reversely for scan, then the arrangement of the content of the original sheet is changed. Thus, the user must be aware of which side of the original sheet should be scanned again as the front surface of the original sheet.

DETAILED DESCRIPTION

In accordance with an embodiment, an image reading apparatus comprises a first reading section, a second reading section, a conveyance section and a control section. The first reading section reads an image formed on a first side of a sheet at a first reading position. The second reading section reads an image formed on a second side of the sheet opposite to the first side at a second reading position different from the first reading position. The conveyance section conveys the sheet sequentially to the first reading section and the second reading section. The control section carries out a first storage operation of storing the image data read by the first reading section in a storage section and a second storage operation of storing the image data read by the second reading section in the storage section. The control section further determines whether or not the reading operation of the first reading section, the reading operation of the second reading section, the first storage operation and the second storage operation are ended normally and deletes, if any one of these operations is not ended normally, the image data of the sheet not scanned normally stored in the storage section.

In accordance with the embodiment, the image reading apparatus adopts an apparatus in which the reading position of the front surface of a sheet is different from that of the back surface of the sheet. The image reading apparatus of the embodiment determines whether or not the scanning on the front surface of a sheet and the scanning on the back surface of the sheet are both ended normally. If an error such as a paper jam occurs during a scan process, then neither the scanning on the front surface of the sheet nor the scanning on the back surface of the sheet is ended normally. Instead of processing the scanned data (image data) obtained when the error occurs as normal data, the image reading apparatus of the embodiment deletes the scanned data if the two sides of the sheet are not completely scanned normally. That is, the image data resulting from the scanning is still the image data of the sheet obtained before the error occurs.

In this way, the user can carry out a unified operation, that is, placing the original sheet with the front surface of the original sheet up to re-execute the scanning.

The present embodiment is described below with reference to accompanying drawings.

Figure 1:
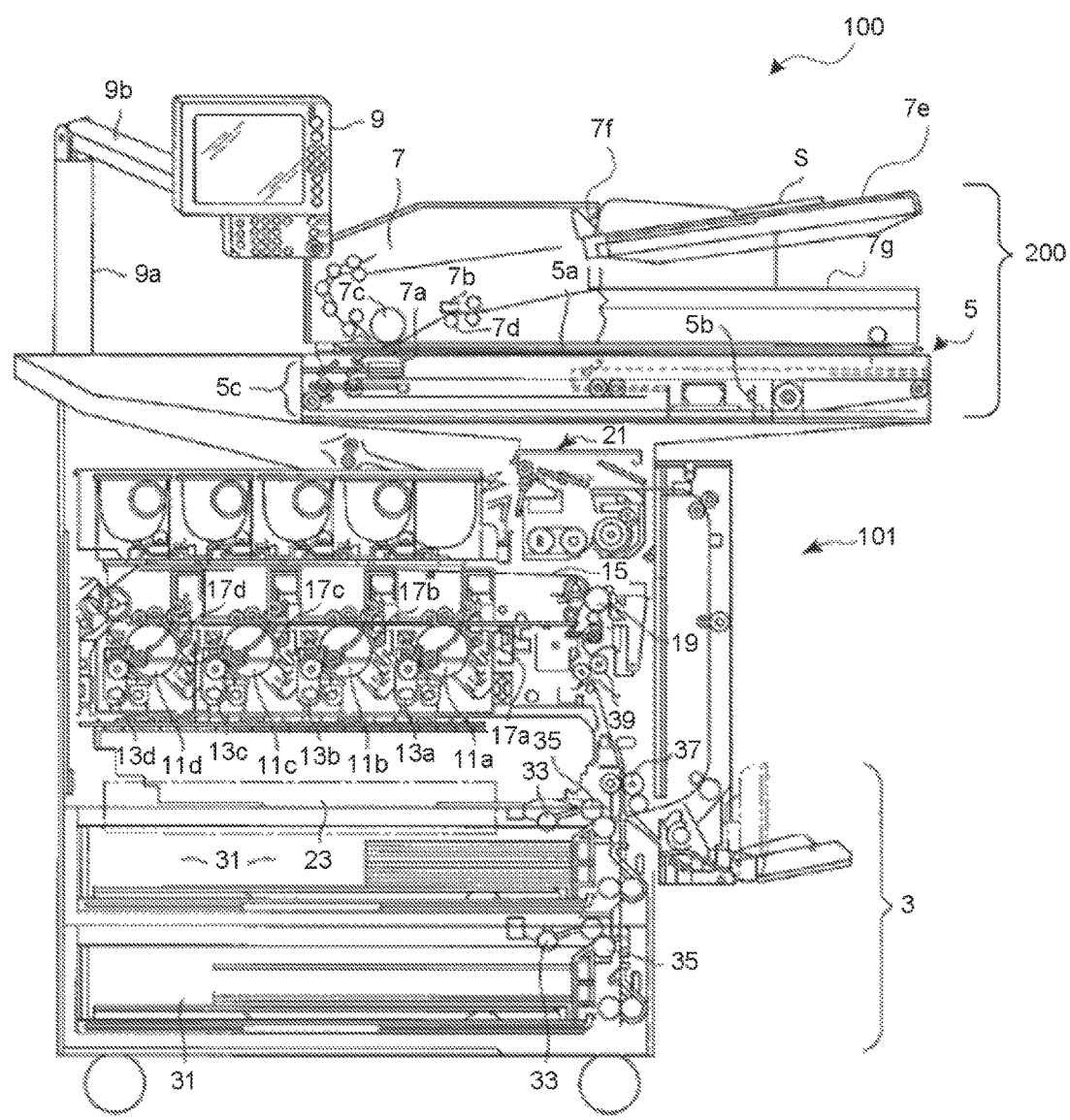
FIG. 1 is a diagram exemplifying the structure of an image forming apparatus according to an embodiment.

FIG. 1 is a diagram illustrating an MFP (Multi-Functional Peripheral) applied in the embodiment. The MFP 100 shown in FIG. 1 comprises an image forming section 101, a sheet feeding section 3 and an image reading section 5. The image forming section 101 inputs image information, forms a toner image on a plain paper sheet or a transparent resin paper and fixes the toner image on the sheet. The sheet feeding section 3 supplies a sheet of an optional size applicable for image output to the image forming section 101.

The image reading section 5 acquires image data by scanning an original sheet. The image reading section 5 outputs the acquired image data to the image forming section 101 or permanently stores the acquired image data in a nonvolatile storage section.

The image forming apparatus (MFP) 100 is equipped with an automatic document feeder 7 for guiding an original sheet to a reading position. The automatic document feeder 7 is located above an original document table 5a of the image reading section 5 on which an original sheet is placed. An image reading apparatus 200 is constituted by the image reading section 5 and the automatic document feeder 7.

The automatic document feeder 7 comprises reading sensors 7a and 7b which convert the image information of an original sheet into electrical signals. The reading sensor 7a converts the image information of a first side of an original sheet S into an electrical signal. The reading sensor 7b converts the image information of a second side of the original sheet S opposite to the first side into an electrical signal. The first side is the upper side of the original sheet S placed on a feed tray 7e, and the second side is the back surface of the original sheet S placed on the feed tray 7e. The first side is hereinafter referred to as 'front surface' and the second side as 'back surface'.

A detection sensor 7f detects whether or not an original sheet S is placed on the feed tray 7e. The detection sensor 7f further detects the thickness and the weight of a bunch of sheets placed on the feed tray 7e. An appropriate number of the sheets forming the sheet bunch can be obtained according to the thickness and the weight.

Black reference information and white reference information, which provide reference values at the time the reading sensor 7a converts image information into an electrical signal, are located at the position where illumination light is supplied for the reading sensor 7a. For example, the black reference information and the white reference information are positioned on a back guide 7c.

Black reference information and white reference information, which provide reference values at the time the reading sensor 7b converts image information into an electrical signal, are located at the position where illumination light is supplied for the reading sensor 7b. For example, the black reference information and the white reference information are positioned on a back guide 7d.

The automatic document feeder 7 conveys a sheet placed on the feed tray 7e sequentially to the reading sensor 7a and the reading sensor 7b and then discharges the sheet from a discharging tray 7g.

A reading sensor 5b is located at a specific position below the original document table 5a and inside the image reading section 5. The reading sensor 5b receives the image information of an original document placed on the original document table 5a through an illumination system 5c.

The image forming apparatus 100 further comprises an operation panel 9. The operation panel 9 receives, from a user, a reading start instruction for instructing the image reading section 5 to start reading the image information of an original document and an image formation start instruction for instructing the image forming section 101 to start forming an image. The operation panel 9 further displays the progress and status of a processing and the information notified to the user. The operation panel 9 is supported, at a corner, for example, the left or right side of the image reading section 5, by a support column 9a and a swing arm 9b which are fixed on the image forming section 101.

The image forming section 101 comprises a first to a fourth photoconductive drums 11a-11d for retaining latent images. The image forming section 101 comprises developing devices 13a-13d for developing which supply a Y (Yellow) toner, a M (Magenta) toner, a C (Cyan) toner and a Bk (Black) toner to the photoconductive drums 11a-11d. The image forming section 101 comprises a transfer belt 15 which sequentially transfers the toner images retained on the photoconductive drums 11a-11d. The image forming section 101 comprises a first to a fourth cleaners 17a-17d which remove the toners left on the photoconductive drums 11a-11d.

The image forming section 101 comprises a transfer device 19 which transfers the toner images retained by the transfer belt 15 onto a sheet. The image forming section 101 comprises a fixing device 21 which fixes the toner images transferred onto the sheet by the transfer device 19 on the sheet. The image forming section 101 further comprises an exposure device 23 for forming latent images on the photoconductive drums 11a-11d.

The sheet feeding section 3 having a plurality of cassettes 31 feeds sheets to the transfer device 19 at specific timings. Sheets of various sizes can be accommodated in the plurality of cassettes 31. A pickup roller 33 picks up a sheet from a corresponding cassette 31 according to an image formation operation.

A separation mechanism 35 prevents two or more sheets from being synchronously picked up by the pickup roller 33.

A conveyance roller 37 conveys the separated single sheet to an aligning roller 39. The aligning roller 39 conveys the sheet to a transfer position where the transfer device 19 is connected with the transfer belt 15 in accordance with a timing when the transfer device 19 transfers a toner image from the transfer belt 15.

The fixing device 21 fixes a toner image corresponding to the image information onto a sheet and sends the sheet fixed with the toner image to a stock section located at a space between the image reading section 5 and a main body 1 of the image forming section.

Figure 2:
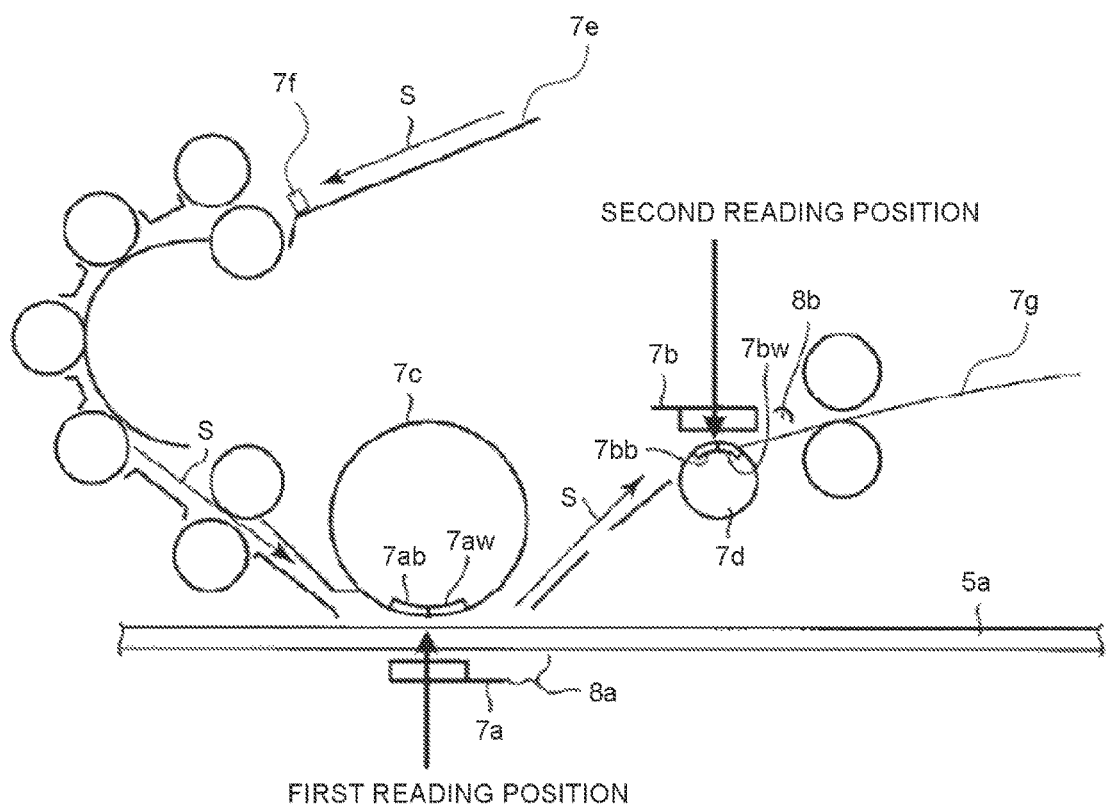
FIG. 2 is a diagram exemplifying the structure of an image reading apparatus according to the embodiment.

FIG. 2 is a diagram illustrating the vicinity of the automatic document feeder 7 and the image reading section 5 shown in FIG. 1.

The reading sensor 7a can read image information when an original sheet S moving towards the original document table 5a of the image reading section 5 in a direction indicated by the arrow is located at a first reading position opposite to the back guide 7c. The reading sensor 7b can read image information when the moving original sheet S is located at a second reading position opposite to the back guide 7d.

The back guide 7c includes black reference information 7ab and white reference information 7aw. The black reference information 7ab and the white reference information 7aw can be set at a position independent from the back guide 7c. Further, an illuminator 8a is located in the vicinity of the back guide 7c or the black reference information 7ab and the white reference information 7aw to provide the light reflected by the black reference information 7ab and the white reference information 7aw to the reading sensor 7a.

The back guide 7d includes black reference information 7bb and white reference information 7bw. The black reference information 7bb and the white reference information 7bw can be set at a position independent from the back guide 7d. Further, an illuminator 8b is located in the vicinity of the back guide 7d or the black reference information 7bb and the white reference information 7bw to provide the light reflected by the black reference information 7bb and the white reference information 7bw to the reading sensor 7b.

As shown in FIG. 2, the reading positions of the reading sensors 7a and 7b are different from each other. The reading sensor 7b reads the back surface of an original sheet S after the reading sensor 7a reads the front surface of the original sheet S.

Figure 3:
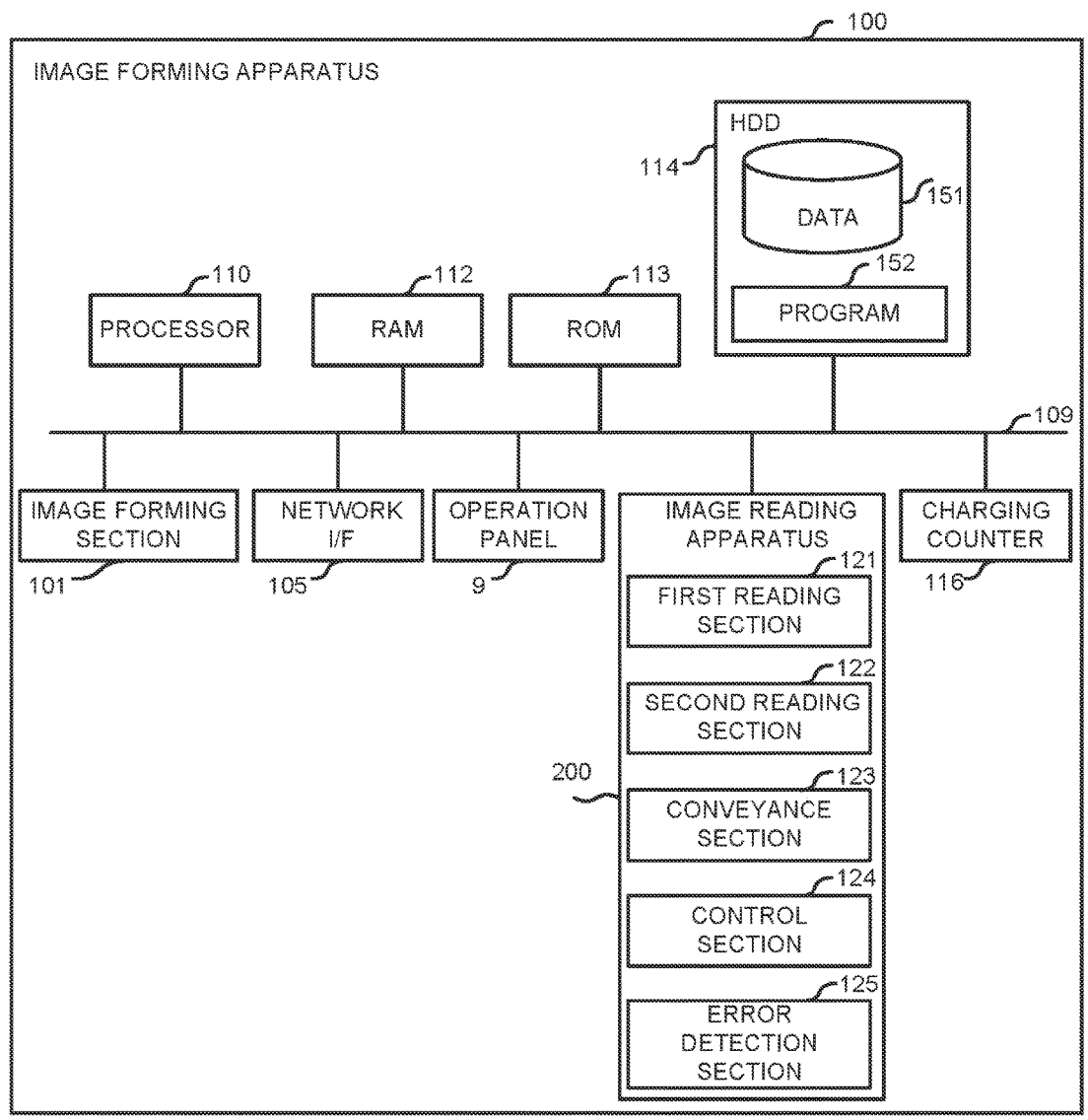
FIG. 3 is a block diagram exemplifying the structure of the image forming apparatus according to the embodiment.

FIG. 3 is a block diagram illustrating the structure of the image forming apparatus 100. The image forming apparatus 100 comprises a processor 110, a RAM (Random Access Memory) 112, a ROM (Read Only Memory) 113, an HDD (Hard Disk Drive) 114, an image forming section 101, a network I/F (Interface) 105, an operation panel 9, an image reading apparatus 200 and a charging counter 116. The image forming section 101 and the operation panel 9 are identical to those shown in FIG. 1 and are therefore not described here repeatedly.

The processor 110 is an arithmetic device such as a CPU (Central Processing Unit). The processor 110 copies or decompresses the programs stored in the ROM 113 or the programs 152 and the data 151 stored in the HDD 114 in the RAM 112 to execute an operation. In this manner, the processor 110 provides various functions while cooperating with each hardware. The RAM 112 is a primary storage device, and the ROM 113 is a device which stores a system program in a nonvolatile manner.

The HDD 114 is an auxiliary storage device which stores the programs 152 and the data 151 for controlling operations in a nonvolatile manner. The HDD 114 temporarily or permanently stores the image data obtained after the execution of a scan job.

The network I/F 105 controls the data communication with an external apparatus.

The image reading apparatus 200 is a structure comprising the image reading section 5 and the automatic document feeder 7. The image reading apparatus 200 comprises a first reading section 121, a second reading section 122, a conveyance section 123, a control section 124 and an error detection section 125.

The first reading section 121 comprising the reading sensor 7a reads the front surface of a conveyed original sheet S. The second reading section 122 comprising the reading sensor 7b reads the back surface of the conveyed original sheet S. The conveyance section 123 comprises a plurality of roller pairs and a conveyance path. The conveyance section 123 conveys an original sheet S placed on the feed tray 7e sequentially to the first reading section 121, the second reading section 122 and the discharging tray 7g.

The control section 124 is a unit which controls the timing of the reading of the first reading section 121 and the second reading section 122 and the conveyance of the conveyance section 123. The control section 124 may carry out the foregoing controls according to an instruction from the processor 110 or independently in the absence of an instruction from the processor 110. Further, it is assumed that the control section 124 is installed by an ASIC (application specific integrated circuit); however, the control section 124 may also be installed by a program control provided with a CPU and a memory. In the embodiment, it is assumed that the image data after the execution of a scan job is stored in the HDD 114; however, it is also applicable that the image data after the execution of a scan job is stored in a volatile/non-volatile storage section arranged in the control section 124.

The error detection section 125 is provided with a sensor which is arranged in the conveyance path of the conveyance section 123 to detect the occurrence of a paper jam during a conveyance process. Further, the error detection section 125 comprises a detection sensor 7f which detects whether or not a sheet is placed and, if there are the placed sheets, detects the number of the original sheets according to the thickness and the weight of a sheet bunch. The error detection section 125 determines whether or not the number of the placed original sheets is not more than a given number. The determination may be carried out by the control section 124.

The error detection section 125 may further cooperate with the processor 110 to detect whether or not the HDD 114 has no remaining capacity (disk full). The situation that there is no remaining capacity in the HDD 114 also includes that the remaining capacity of the HDD 114 is not enough for the data size of the image data generated during a scan job.

The charging counter is a unit for counting up in a case of carrying out a scan processing, a printing processing, a copying processing or an FAX sending/receiving processing (that is, in a case of carrying out a job). The count value is a value for determining the amount that should be paid to the vendor who provides the image forming apparatus 100. Further, the value counted up may change with the type of a job, a type 'color'/'monochrome' and the size of a sheet.

Figure 4:
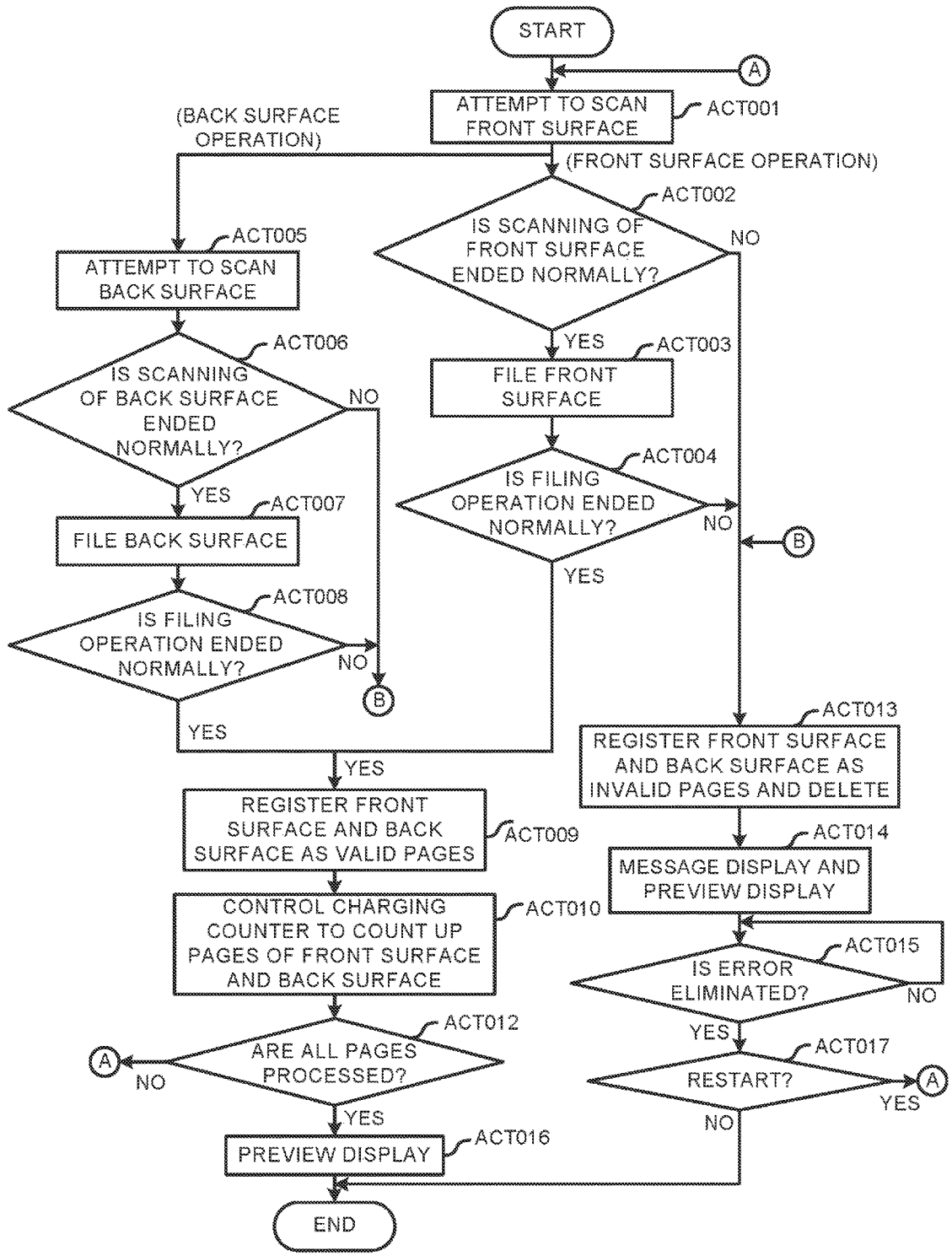
FIG. 4 is a flowchart exemplifying the operations carried out according to the embodiment.

FIG. 4 is a flowchart exemplifying the scan operations executed by the image reading apparatus 200. It is assumed that the operations shown in FIG. 4 are executed by the processor 110 of the image forming apparatus 100. That is, the processor 110 of the image forming apparatus 100 carries out an operation according to codes of the program 152 to send an instruction to the control section 124. Then, the operations shown in the flowchart of FIG. 4 are executed.

It is also applicable that the control section 124 of the image reading apparatus 200 carries out the flowchart shown in FIG. 4 according to a control conducted by the circuit of the control section 124 and a program control in the absence of an instruction from the processor 110. That is, the operations shown in the flowchart of FIG. 4 are executed by the control section 124.

The processor 110 first activates the conveyance section 123 to feed an original sheet S placed on the feed tray 7e into the inside of the image forming apparatus. The processor 110 activates the conveyance section 123 to convey the original sheet S to the first reading section 121 and activates the first reading section 121 to attempt to scan the front surface of the original sheet S (Act 001).

Further, in the flowchart shown in FIG. 4, after Act 001 is carried out, the conveyance section 123 continuously conveys the original sheet S in parallel to the second reading section 122. The second reading section 122 attempts to scan the back surface of the original sheet S according to an instruction from the processor 110 (Act 005). The operations executed to scan the back surface of the original sheet S will be described later.

After Act 001 is carried out, the processor 110 determines whether or not the scanning of the front surface of the original sheet S is ended normally (Act 002). The determination is based on whether or not an error is detected by the error detection section 125. That is, the result of the determination of Act 002 is 'No' if an error, for example, a paper jam, occurs and is detected by the error detection section 125 and 'Yes' if no error is detected by the error detection section 125. The flow proceeds to Act 013 if the scanning of the front surface of the original sheet S is not ended normally (Act 002: No).

If the scanning of the front surface of the original sheet S is ended normally (Act 002: Yes), the processor 110 carries out an operation of writing the image data of the scanned front surface into the HDD 114, that is, an operation of filing the image data (a first storage operation) (Act 003). Further, there is image data already filed if the job that is being processed is a scan job operation on a plurality of sheets (a sheet bunch) and the sheet that is being currently processed is a sheet en route. In this case, the filled image data is added in and combined with the existing image data.

The processor 110 determines whether or not the filing operation is ended normally (Act 004). The writing of data into the HDD 114 fails if the disk of the HDD 114 is full, an error occurs in a data IO or a fault occurs. The writing of data into the HDD 114 succeeds if none of the foregoing phenomena occurs. The result of the determination of Act 004 is 'No' if the writing of data into the HDD 114 fails, then the flow proceeds to Act 013. Further, the error detection section 125 may further detect whether or not the image data is filed normally.

The result of the determination of Act 004 is 'Yes' if the writing of data into the HDD 114 succeeds (Act 004: Yes); in this case, the processor 110 waits until the operations performed on the back surface of the sheet are ended.

Next, the operations are described which are performed on the back surface of the sheet after Act 005 is carried out. The processor 110 determines whether or not the scanning of the back surface of the original sheet S is ended normally (Act 006). Like that of Act 002, the determination of Act 006 is based on whether or not an error is detected by the error detection section 125. The flow proceeds to Act 013 if the scanning of the back surface of the original sheet S is not ended normally (Act 006: No).

If the scanning of the back surface of the original sheet S is ended normally (Act 006: Yes), the processor 110 carries out an operation of writing the image data of the scanned back surface into the HDD 114, that is, an operation of filing the image data (a second storage operation) (Act 007). The processor 110 determines whether or not the filing operation is ended normally (Act 008). That is, the processor 110 carries out, for the image of the back surface of the original sheet S, the operations in Acts 007 and 008 identical to that in Act 003 and Act 004. The flow proceeds to Act 013 if the result of the determination of Act 008 is 'No' (Act 008: No).

If it is determined in Act 008 that the filing operation is ended normally (Act 008: Yes), then the scanning of the front surface of the original sheet and the scanning of the back surface of the original sheet are both ended normally, and thus, the processor 110 registers the original sheet as a valid page (Act 009). Herein, the processor 110 treats the original sheet as a valid page by setting a specific flag value to a value indicating 'valid'.

The processor 110, with reference to the flag value, if the flag value is a valid value, controls the charging counter 116 to count up the pages of the front surface and the back surface of the original sheet (Act 010).

The processor 110 determines, according to a signal value from the detection sensor 7f, whether or not each original sheet is processed (Act 012). If not all original sheets are processed (Act 012: No), the processor 110 returns to carry out the processing in Act 001 to process the next original sheet. If all original sheets are processed (Act 012: Yes), the processor 110 carries out a control to display the filed image data on the operation panel 9 for preview (Act 016).

The flow proceeds to Act 013, as stated above, if the result of the determination of any one of Act 002, Act 004, Act 006 and Act 008 is 'No'. In Act 013, in a case where the sheet is filed when the front surface and the back surface of the sheet are both set as invalid pages, the processor 110 deletes the file (Act 013). Further, only the file of the front surface of the sheet subjected to the error is deleted if only the front surface of the sheet subjected to the error is filed. Further, the files of the front surface and the back surface of the sheet subjected to the error are both deleted when the front surface and the back surface of the sheet subjected to the error are both filed. That is, in Act 013, the image data (the front surface image if the error exists on only the front surface and the images of the front surface and the back surface if the error exists on both sides) of the sheet, stored in the storage section, which is not scanned normally is deleted.

The deletion of Act 013 further includes an operation of not adding the file for the front surface or the back surface of the failed sheet if the image data of a valid sheet is already stored when the current page is processed. In this case, the valid image data available before the current processing is kept in the HDD 114 as it is.

The processor 110 treats the sheet as an invalid page by setting the flag value to a value indicating 'invalid'.

The processor 110 controls the operation panel 9 to display a message to notify the user of the occurrence of the error (Act 014). The content of the message includes the type of the error (e.g. paper jam or HDD fault) and a coping method. The content of the message further includes information on how to place the sheet subjected to the error in the feed tray 7e. The information on how to again place the sheet subjected to the error in the feed tray 7e may be, for example, 'please place the front surface of the page on which the error occurs up, reset the original document and press the start button'. At this time, the processor 110 controls the operation panel 9 to display image data scanned normally so far. In this case, the operation panel 9 may display a series of images made up of the first page on which a scan job is performed to the page on which the scan job is ended normally or only display the last normally scanned page.

The processor 110 enters a standby state until the error detected by the error detection section 125 is eliminated (loop of Act 015: No). After the error is eliminated (Act 015: Yes), the processor 110 carries out the processing starting with Act 001 for the original sheet subjected to the error again if the user presses a specific button to give an instruction for the restart of a scan job (Act 017: Yes). In this case, the processor 110 checks the flag value, if the flag value is a value indicating 'invalid', then it is determined that the processing is in progress, and the writing of image data into the HDD 114 becomes an addition writing operation. Further, the processor 110 carries out the processing in Act 001 after changing the invalid value to a valid value or another value.

Further, in Act 017, for example, the processing is ended after a cancel button is pressed (Act 017: No).

An error, although described as a paper jam, the 'disk full' of the HDD 114 and an IO fault in the description of the flowchart of FIG. 4, may also be the overload of load capacity of the feed tray 7e or the generation of more than a given amount of image data. That is, a halt occurring during the execution process of a job is considered as an error. The term 'error' may also be replaced by defect or fault.

Further, the internal structure of the image reading apparatus 200 is not limited to that described above. The image reading apparatus 200 may comprise a part or the whole of each unit or apparatus described with reference to FIG. 1-FIG. 3. Specifically, the charging counter 116 may also be included in the image reading apparatus 200. The operation panel 9 may also be included in the image reading apparatus 200. The processor 110, the RAM 112, the ROM 113 and the HDD 114 may also be included in the image reading apparatus 200.

In the embodiment of the present invention, the image reading apparatus 200 is described as a structure included in the image forming apparatus 100; however, the image reading apparatus 200 may also be provided independently.

In the embodiment of the present invention, the functions for realizing the foregoing embodiment are pre-recorded inside the apparatus; however, the present invention is not limited to this. The same functions may also be downloaded in the apparatus from a network, or a device which enables a recording medium to store the same functions may be installed in the apparatus. The recording medium may be any recording medium of any form as long as it, for example, a CD-ROM, is capable of storing programs and is readable by an apparatus. Further, the functions achieved by being installed or downloaded in advance can be realized through the cooperation with an OS (Operating System) inside the apparatus.

In accordance with the embodiment of the present invention, when an error such as a paper jam occurs during the duplex scanning process of an original sheet, to scan the original document again, the user optionally places the original sheet without regard to the method of placing the original sheet.

While certain embodiments have been described, these embodiments have been presented byway of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An image reading apparatus, comprising:
a memory that stores program instructions;
a processor that executes the program instructions stored in the memory;
a first reading section that reads a first image formed on a first side that is an upper surface of a sheet at a first reading position;
a second reading section that reads a second image formed on a second side of the sheet opposite to the first side at a second reading position different from the first reading position;
a feed tray that places the sheet conveyed to the first reading section and the second reading section;
a conveyance section that conveys a plurality of the sheets sequentially to the first reading section and the second reading section;
a control section that
carries out a first storage operation of storing first image data of the each of the sheets read by the first reading section in a storage section and a second storage operation of storing second image data of the each of the sheets read by the second reading section in the storage section,
determines for the each of the sheets whether or not a first reading operation of the first reading section, a second reading operation of the second reading section, the first storage operation and the second storage operation are ended normally,
if all of the operations are ended normally;
registers the first side and the second side of the each of the sheets that ended normally as a valid page,
if any one of the operations are not ended normally;
stops the reading operation of the sheet that did not end normally
deletes the first image data of the first side, if the image data of the first side is stored in the storage section in the first storage operation of the sheet that did not end normally, and
deletes the second image data of the second side, if the image data of the second side is stored in the storage section in the second storage operation of the sheet that did not end normally; and
a display section, wherein
the control section is further configured to control the display section to
display at least the image of the last registered page, and
notifies a user to place the sheet not scanned normally on the feed tray with the first side up and to re-execute the scanning.

2. The image reading apparatus according to claim 1, further comprising:
an error detection section configured to detect whether a paper jam occurs in the conveyance section, wherein
the control section determines that the first reading operation of the first reading section and the second reading operation of the second reading section are not ended normally if the paper jam is detected by the error detection section.

3. The image reading apparatus according to claim 1, wherein
the control section determines that the first storage operation and the second storage operation are not ended normally if a remaining capacity of the storage section is not enough for a magnitude of the first image data obtained through the first storage operation and the second image data obtained through the second storage operation.

4. The image reading apparatus according to claim 1, further comprising:
a charging counter, wherein
the control section controls the charging counter to count up both parts of the first side and the second side if the first reading operation of the first reading section and the second reading operation of the second reading section and the first storage operation and the second storage operation are all ended normally.

5. The image reading apparatus according to claim 4, wherein
the control section controls the charging counter not to count up if any one of the first reading operation of the first reading section and the second reading operation of the second reading section and the first storage operation and the second storage operation is not ended normally.

6. The image reading apparatus according to claim 1, wherein
the control section controls the display section to display the respective image data which is normally ended so far if any one of the first reading operation of the first reading section and the second reading operation of the second reading section and the first storage operation and the second storage operation is not ended normally.

7. The image reading apparatus according to claim 1, further comprising:
an automatic document feeder of an image forming apparatus.

8. An image reading method for reading an image formed on a sheet by an image reading apparatus, including:
reading a first image formed on a first side that is an upper surface of the sheet at a first reading position;
reading a second image formed on a second side of the sheet opposite to the first side at a second reading position different from the first reading position;
placing the sheet conveyed to the first reading position and the second reading portion;
conveying a plurality of the sheets sequentially to the first reading position and the second reading position;
carrying out a first storage operation of storing first image data of the each of the sheets read at the first reading position in a storage section and a second storage operation of storing second image data of the each of the sheets read at the second reading position in the storage section;
determining for each of the sheets whether or not the first reading operation, the second reading operation, the first storage operation and the second storage operation are ended normally,
if all of the operations are ended normally,
registering the first side and the second side of each of the sheets that ended normally as a valid page,
if any one of the operations is not ended normally,
stopping the reading operation of the sheet that did not end normally,
deleting the first image data of the first side, if the image data of the first side is stored in the storage section in the first storage operation of the sheet that did not end normally; and deleting the second image data of the second side, if the image data of the second side is stored in the storage section in the second storage operation of the sheet that did not end normally, and displaying at least the image of the last registered page, and notifying a user to place the sheet not scanned normally on the feed tray with the first side up and to re-execute the scanning.

9. The image reading method according to claim 8, wherein when a paper jam occurs, it is determined that a reading operation at the first reading position and the reading operation at the second reading position are not ended normally.

\* \* \* \* \*